(12) United States Patent  
Jiang et al.

(10) Patent No.: US 10,998,846 B2
(45) Date of Patent: May 4, 2021

(54) CONTROL SYSTEM AND CONTROL METHOD (71) Applicant: Hangzhou Sanhua Research Institute Co., Ltd., Zhejiang (CN)

(72) Inventors: Xiaojun Jiang, Zhejiang (CN); Likun Yang, Zhejiang (CN); Edwin J. Stanke, Zhejiang (CN); Jinlan Xie, Zhejiang (CN)

(73) Assignee: Hangzhou Sanhua Research Institute Co., Ltd., Zhejiang (CN)

( * ) Notice: Subject to any disclaimer, the term of this patent is extended or adjusted under 35 U.S.C. 154(b) by 0 days.

(21) Appl. No.: 16/603,214

(22) PCT Filed: May 17, 2018

(86) PCT No.: PCT/CN2018/087244
§ 371 (c)(1),
(2) Date: Oct. 4, 2019

(87) PCT Pub. No.: WO2018/214797
PCT Pub. Date: Nov. 29, 2018

(65) Prior Publication Data
US 2020/0304055 A1 Sep. 24, 2020

(30) Foreign Application Priority Data

May 24, 2017 (CN) .......................... 201710371690.5

(51) Int. Cl.
*H02P 29/10* (2016.01)
*H02P 23/14* (2006.01)

(52) U.S. Cl.
CPC .............. *H02P 29/10* (2016.02); *H02P 23/14* (2013.01)

(58) Field of Classification Search
None
See application file for complete search history.

(56) References Cited

U.S. PATENT DOCUMENTS 3,557,354 A * 1/1971 Trimble ................. G06F 17/18
702/194
4,334,237 A * 6/1982 Reitmeier ............ H04B 14/046
348/619

(Continued)

FOREIGN PATENT DOCUMENTS

CN 103516281 A 1/2014
CN 105743399 A 7/2016

(Continued)

OTHER PUBLICATIONS

International Search Report and Written Opinion for International Application No. PCT/CN2018/087244, dated Aug. 15, 2018.

(Continued)

*Primary Examiner* — Bentsu Ro
(74) *Attorney, Agent, or Firm* — Wolf, Greenfield & Sacks, P.C.

(57) ABSTRACT

A control method and a control system, by which a motor can be controlled. The control system includes a central processing module and a drive control module. In a period in which a voltage is not applied to any phase coil of the motor, the drive control module collects voltages of the coil to which the voltage is not applied, and converts the voltages of the coil into digital signals. The central processing module reads the digital signals and determines whether the running speed of the motor is consistent with a preset speed depending on whether an average value of the digital signals falls within a preset threshold range, which helps to improve the control precision.

16 Claims, 8 Drawing Sheets

(56) References Cited

U.S. PATENT DOCUMENTS

| | | | |
|---|---|---|---|
| 9,281,832 B1* | 3/2016 | Thiagarajan | H03M 1/127 |
| 9,337,769 B2 | 5/2016 | Gauthier | |
| 10,033,313 B2 | 7/2018 | Feng et al. | |
| 2001/0045812 A1 | 11/2001 | Seki et al. | |
| 2016/0221416 A1 | 8/2016 | Jiang et al. | |
| 2017/0126153 A1 | 5/2017 | Lepka et al. | |

FOREIGN PATENT DOCUMENTS

| | | |
|---|---|---|
| CN | 106291058 A | 1/2017 |
| JP | S55-120384 A | 9/1980 |
| JP | 2001-275387 A | 10/2001 |
| JP | 2011-259525 A | 12/2011 |
| JP | 2016-534304 A | 11/2016 |

OTHER PUBLICATIONS

Office Action for Japanese Application No. 2019-555795, dated Oct. 27, 2020.

* cited by examiner

CONTROL SYSTEM AND CONTROL METHOD

This application is a national stage filing under 35 U.S.C. § 371 of International Patent Application Serial No. PCT/CN2018/087244, filed on May 17, 2018, which claims the priority to Chinese Patent Application No. 201710371690.5, filed on May 24, 2017 with the China National Intellectual Property Administration. The entire contents of these applications are incorporated herein by reference in their entirety.

FIELD

The present application relates to the field of control technology, and in particular to a control system and a control method for controlling a motor.

BACKGROUND

A motor is installed on a driven device or a driven component. When the motor starts, an actual running speed of the motor does not match with a set speed, while the subsequent operation is based on the set speed, which will cause a large error and even cause a motor burning phenomenon in severe cases. In order to avoid such phenomenon, it is required to control the running speed of the motor.

Therefore, there is a need to improve the conventional technology to solve the above technical issues.

SUMMARY

An object of the present application is to provide a control method and a control system for controlling a running speed of a motor.

In order to achieve the above object, a control system is provided according to the present application. The control system is used to control a motor, and includes a central processing module and a drive control module.

when the motor is running, the drive control module is configured to sample a voltage of a phase coil of the motor, to which no voltage is applied, during a period in which no voltage is applied to any phase coil of the motor, and convert the voltage of the phase coil of the motor, to which no voltage is applied, into a digital signal;

the control system is configured to store the digital signal and update the digital signal in real time during the period in which no voltage is applied to any phase coil of the motor;

the central processing module is configured to read the digital signal, and obtain a present average value by performing a mathematical operation on the present digital signal and either a previous average value or an initial value; and the central processing module is configured to determine whether the present average value falls between a first threshold and a second threshold, wherein the first threshold and the second threshold are set corresponding to a preset speed, and the central processing module is configured to determine whether a running speed of the motor is consistent with the preset speed according to a determination result and send out a control signal.

Optionally, the drive control module includes a coil sample-and-hold circuit and an ADC circuit, the coil sample-and-hold circuit is configured to sample the voltage of the coil, and the ADC circuit is configured to convert the sampled voltage signal of the coil into the digital signal.

Optionally, the drive control module further includes a logic processing register, the logic processing register includes a bemf register, and the bemf register is configured to store the digital signal converted by the ADC circuit.

Optionally, the logic processing register further includes a micro-step register, and the micro-step register is configured to store a micro-step value of a stepping motor.

Optionally, the logic processing register is configured to provide a clock signal to the coil sample-and-hold circuit, to allow voltage sampling of the coil performed by the coil sample-and-hold circuit occurs during the period in which no voltage is applied to any phase coil of the motor.

A control method for controlling a motor is further provided according to the present application. The control method is implemented by the control system, and the control system includes a central processing module and a drive control module;

when the motor is running, the drive control module is configured to sample a voltage of a phase coil of the motor, to which no voltage is applied, during a period in which no voltage is applied to any phase coil of the motor, and convert the voltage of the phase coil of the motor, to which no voltage is applied, into a digital signal;

the control system is configured to store the digital signal and update the digital signal in real time during the period in which no voltage is applied to any phase coil of the motor;

the central processing module is configured to read the digital signal, obtain a present average value of the digital signal, and perform the control method, and the control method includes the following steps:

a1, reading a first threshold $Bemf_{min}$, a second threshold $Bemf_{max}$ and either an initial value $Bemfaver_0$ or a previous average value;

a2, reading a digital signal $Bemf_i$;

a3, calculating a present average value $Bemfaver_i$ according to an equation $Bemfaver_i=(aBemfaver_{i-1}+bBemf_i)/(a+b)$, wherein i represents the number of times the digital signal is read, i=1, 2 . . . , and when i=1, $Bemfaver_{i-1}$ is the initial value $Bemfaver_0$;

a4, determining whether the present average value $Bemfaver_i$ falls between the first threshold $Bemf_{min}$ and the second threshold $Bemf_{ma}$, and if yes, proceeding to Step a2, otherwise proceeding to Step a5; and a5, determining that a running speed of the motor is inconsistent with a preset speed and sending out a control signal.

Another control method for controlling a motor is further provided according to the present application. The control method is implemented by the control system, and the control system includes a central processing module and a drive control module;

when the motor is running, the drive control module is configured to sample a voltage of a phase coil of the motor, to which no voltage is applied, during a period in which no voltage is applied to any phase coil of the motor, and convert the voltage of the phase coil of the motor, to which no voltage is applied, into a digital signal;

the control system is configured to store the digital signal and update the digital signal in real time during the period in which no voltage is applied to any phase coil of the motor;

the central processing module is configured to read the digital signal, obtain a present average value of the digital signal, and perform the control method, the control method includes the following steps:

a1, reading a first threshold $Bemf_{min}$, a second threshold $Bemf_{max}$ and either an initial value $Bemfaver_0$ or a previous average value;

a2, reading a digital signal $Bemf_i$;

a3, calculating a present average value $Bemfaver_i$ according to an equation $Bemfaver_i=(Bemfaver_{i-1}+Bemf_i)/2$, wherein i represents the number of times the digital signal is read, i=1, 2 . . . , and when i=1, $Bemfaver_i$ is the initial value $Bemfaver_0$;

a4, determining whether the present average value $Bemfaver_i$ falls between the first threshold $Bemf_{min}$ and the second threshold $Bemf_{max}$, and if yes, proceeding to Step a2; otherwise proceeding to Step a5; and a5, determining that a running speed of the motor is inconsistent with a preset speed and sending out a control signal.

Optionally, the control method further includes Step b3 after Step a2:

Step b3, determining whether a moment when the digital signal is read is within the period in which no voltage is not applied to any phase coil of the motor, and if yes, proceeding to Step a2, otherwise proceeding to Step a3.

Optionally, the control method further includes Step b31 after Step b3:

Step b31, determining whether there is one period, in which no voltage is applied to any phase coil of the motor, included between the read digital signal and the previous digital signal, and if yes, proceeding to Step a3, otherwise proceeding to Step a2.

Optionally, the control method further includes Step b2 after Step a1 or before Step a1.

Step b2, controlling a motor speed to avoid a resonance interval of the motor, wherein a speed corresponding to the motor resonance interval is related to properties of the motor itself.

Compared with the conventional technology, the control system provided by the present application can control the operation of the motor. The control system includes the central processing module and the drive control module. The central processing module sends, based on an operating state of the motor, a drive signal to control actions of the motor. When the motor is running, the drive control module samples the voltage of the phase coil of the motor, to which no voltage is applied, during the period in which no voltage is applied to any phase coil of the motor, and converts the voltage of the phase coil into the digital signal. The control system stores the digital signal and updates the digital signal in real time during the period in which no voltage is applied to any phase coil of the motor. The central processing module reads the digital signal and obtains the present average value by performing a calculation on the present digital signal and either the previous average value or the initial value. The central processing module determines whether the present average value falls between the first threshold and the second threshold, where the first threshold and the second threshold are set corresponding to the preset speed, and further determines whether the running speed of the motor is consistent with the preset speed based on the determination result. The central processing module determines whether the speed of the motor matches the preset speed by determining whether the present average value falls within the threshold range, thus realizing monitoring the running speed in real time and improving the accuracy of the motor control.

DETAILED DESCRIPTION OF EMBODIMENTS

The technical features and advantages of the embodiments of the present application are described in detail below with reference to the accompanying drawings.

A motor includes a coil and a rotor. A control system is capable of controlling the operation of the motor. The control system includes a central processing module and a drive control module. The central processing module sends a drive signal to control actions of the motor according to an operating state of the motor. When the motor is running, the drive control module samples a voltage of a phase coil of the motor, to which no voltage is applied, during a period in which no voltage is applied to any phase coil of the motor, and converts the voltage of the phase coil into a digital signal. The control system stores the digital signal and updates the digital signal in real time during the period in which no voltage is applied to any phase coil of the motor. The central processing module reads the digital signal and obtains a present average value by performing a mathematical operation on a present digital signal and either a previous average value or an initial value. The central processing module determines whether the present average value falls between a first threshold and a second threshold, where the first threshold and the second threshold are set corresponding to a preset speed, and the central processing module determines whether a running speed of the motor is consistent with the preset speed according to a determination result. In this way, whether the running speed is consistent with the preset speed is determined by judging whether the present average value falls within an interval between the first threshold and the second threshold, thus realizing monitoring the running speed in real time and facilitating improving the control accuracy.

The motor in the present application may be applied to an electronic expansion valve, an electronic water valve and other motor-driven products. As an example, the motor, the control system and the control method herein are applied to the electronic expansion valve, and the control system provided by the present application is described in detail in conjunction with FIG. 1, FIG. 2 and FIG. 3.

Figure 1:
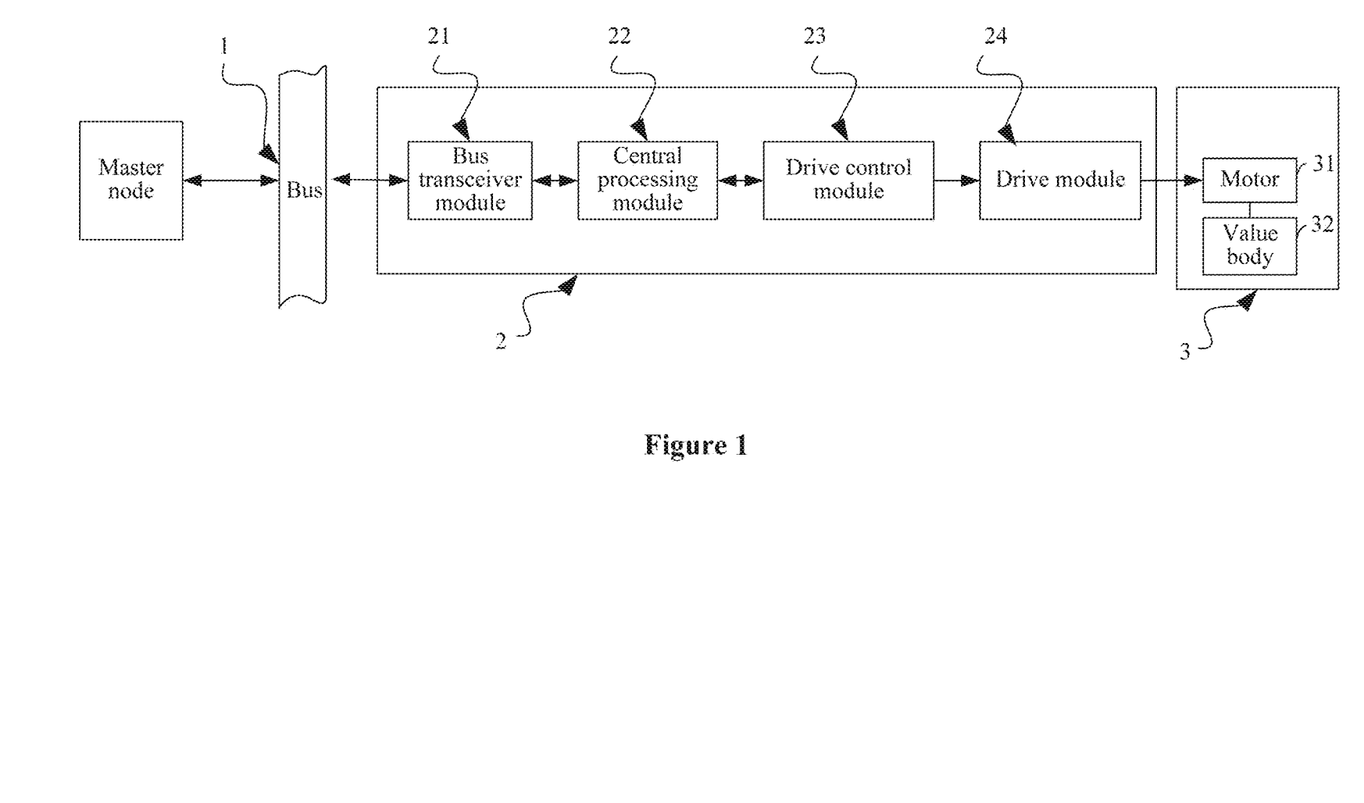
FIG. 1 is a schematic functional diagram of a first embodiment of a control system according to the present application.

Referring to FIG. 1, in this embodiment, the control system 2 includes a bus transceiver module 21, a central processing module 22, a drive control module 23 and a drive module 24. The electronic expansion valve 3 includes a motor 31 and a value body 32. The control system 2 is connected with a bus 1 and the electronic expansion valve 3. The bus transceiver module 21 is configured to receive a control signal sent by the bus 1 and send the control signal to the central processing module 22. The central processing module 22 performs a method operation after reading the digital signal and determines the operating state of the motor 31. When the motor is running, the drive control module 23 samples a voltage of a phase coil of the motor, to which no voltage is applied, during a period in which no voltage is applied to any phase coil of the motor, converts the sampled voltage of this phase coil of the motor into a digital signal, and stores the digital signal. Apparently, the digital signal may be stored in other positions. The drive module 24 is configured to receive the control signal sent by the drive control module 23, and control the on and off of the current supply of the motor 31. Apparently, the bus transceiver module 21 may be a LIN transceiver module or other communication module such as a CAN transceiver module or a PWM communication module.

Figure 2:
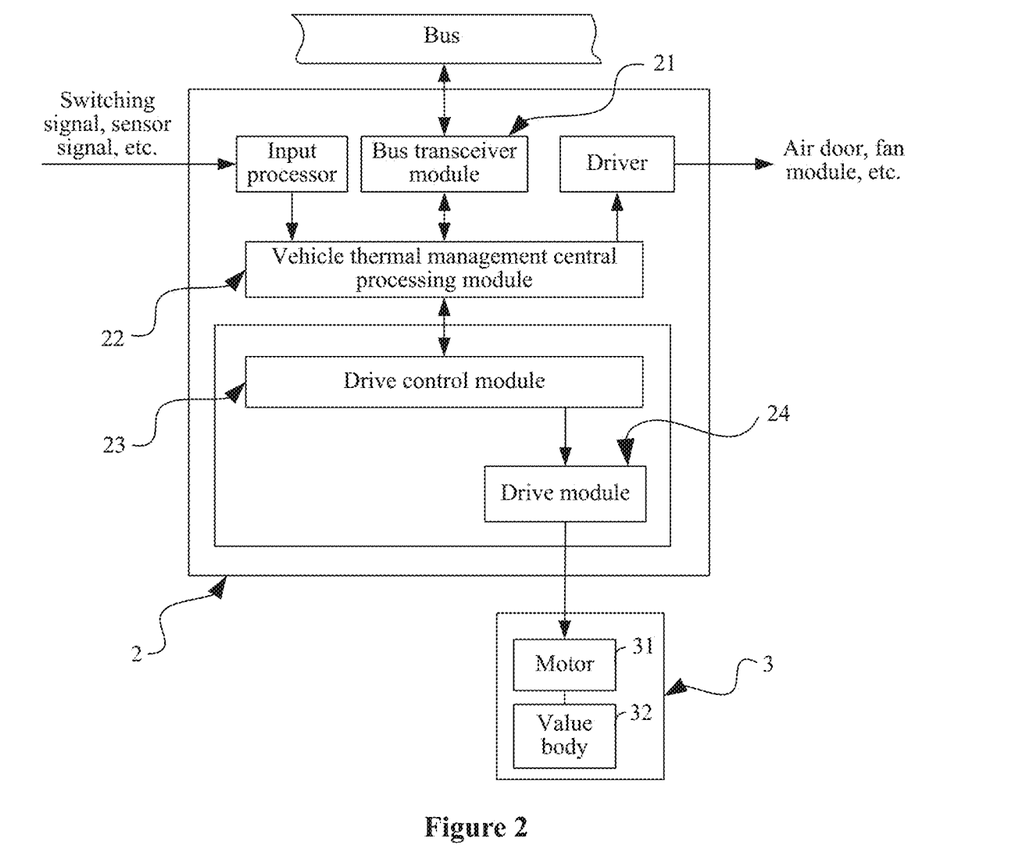
FIG. 2 is a schematic functional diagram of a second embodiment of the control system according to the present application.

Referring to FIG. 2, in this embodiment, the control system 2 includes a bus transceiver module 21, a central processing module, a drive control module 23 and a drive module 24. The central processing module is integrated in a vehicle thermal management central processing module 22. In addition to sending control signals to the drive control module 23, the vehicle thermal management central processing module 22 also sends control signals to other devices of the vehicle. Such arrangement of the central processing module saves space and simplifies connections of the control system. The bus transceiver module 21 is configured to receive a control signal sent by a LIN bus or/and CAN bus 1 and send the control signal to the vehicle thermal management central processing module 22, where the bus transceiver module 21 may also be other communication module, such as a PWM communication module.

Figure 3:
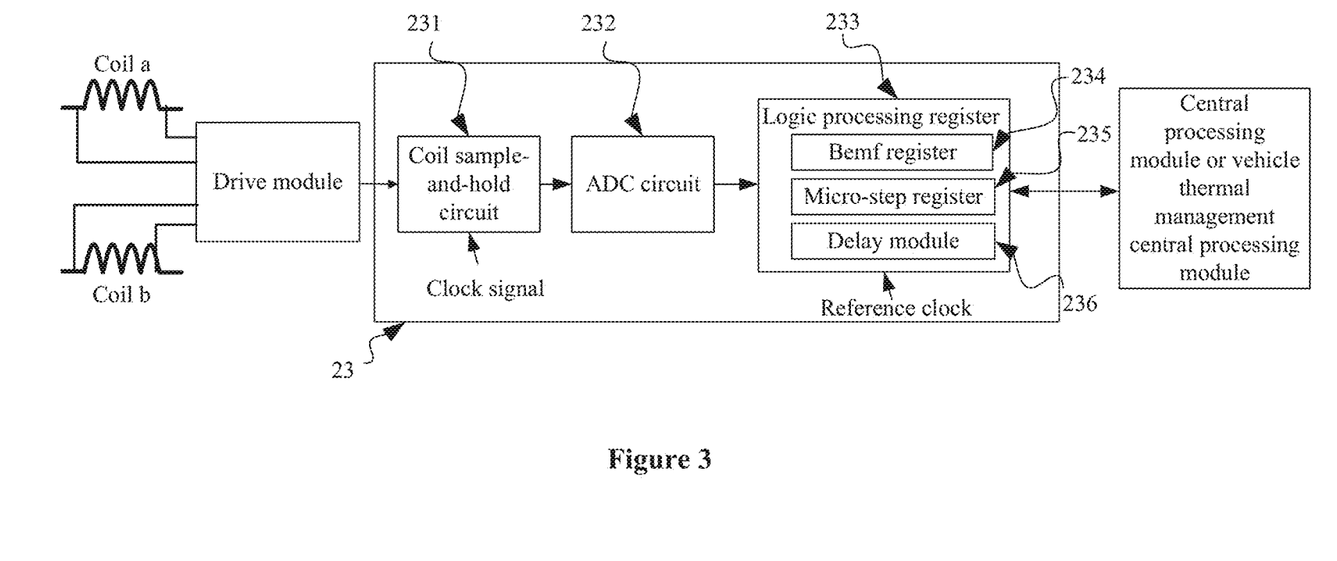
FIG. 3 is a schematic diagram of an embodiment of a drive control module shown in FIG. 1 or FIG. 2.

FIG. 3 is a schematic diagram of an embodiment of the drive control module 23. In this embodiment, the drive control module 23 includes a coil sample-and-hold circuit 231, an ADC circuit 232 and a logic processing register 233. The coil sample-and-hold circuit 231 alternately selects one of the coils a and b of the motor as a present voltage sampling source, that is, the coil a is selected as the present voltage sampling source when starting sampling, and the coil b is selected as the present voltage sampling source for next time, such that the sampling is performed alternately, and the voltage across two ends of the selected coil is sampled and output by the coil sample-and-hold circuit to the ADC circuit 232. The ADC circuit 232 converts an analog signal into a digital signal and outputs the digital signal. The logic processing register 233 includes a bemf register 234 configured to store the digital signal sent by the ADC circuit 232, and the digital signal converted by the ADC circuit 232 is updated accordingly in the bemf register 234. The logic processing register 233 operates according to an input reference clock. The logic processing register 233 may provide a clock signal to the coil sample-and-hold circuit 231, such that voltage sampling of the coil is performed by the coil sample-and-hold circuit 231 only during a period in which no voltage is applied to any phase coil of the motor.

The logic processing register 233 further includes a micro-step register 235. A value stored in the micro-step register 235 is a micro-step value corresponding to the current running position of the motor. Therefore, by reading the value stored in the micro-step register, it can be determined at which micro-step position the motor is running currently. In a case that a set value for a motor stepping mode is 16 micro-steps (that is, a full step is divided into 16 micro-steps), a value range of the register may range from 0 to 63, and the range corresponds to 4 full steps, that is, one drive cycle. When the set value for the stepping mode is changed, the range of the register may be changed accordingly.

The drive control module 23 samples a voltage of a phase coil, to which no voltage is applied, during the period in which no voltage is applied to any phase coil of the motor, and converts the voltage of this phase coil into the digital signal. During the period, the drive control module 23 samples the voltage of the coil multiple times, and the number of times the voltage is sampled depends on a motor speed and a sampling frequency. Generally, the higher the motor speed and the greater the sampling frequency, the more the number of times the coil voltage is sampled, and each sample value of the coil voltage is updated into the bemf register 234 in real time.

The above sampling process is described below in conjunction with FIG. 4, FIG. 5 and FIG. 6.

Figure 4:
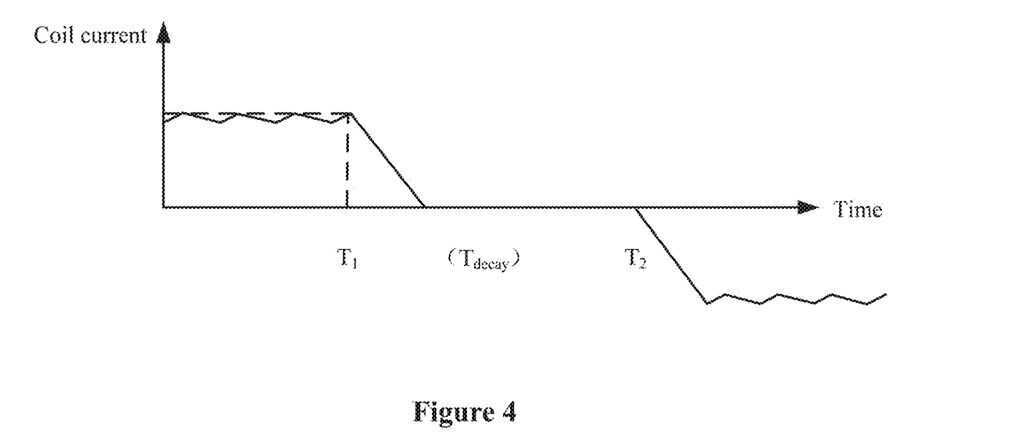
FIG. 4 is a schematic diagram showing the correspondence relationship between the current of a phase coil, to which no voltage is applied, and the time.
Figure 5:
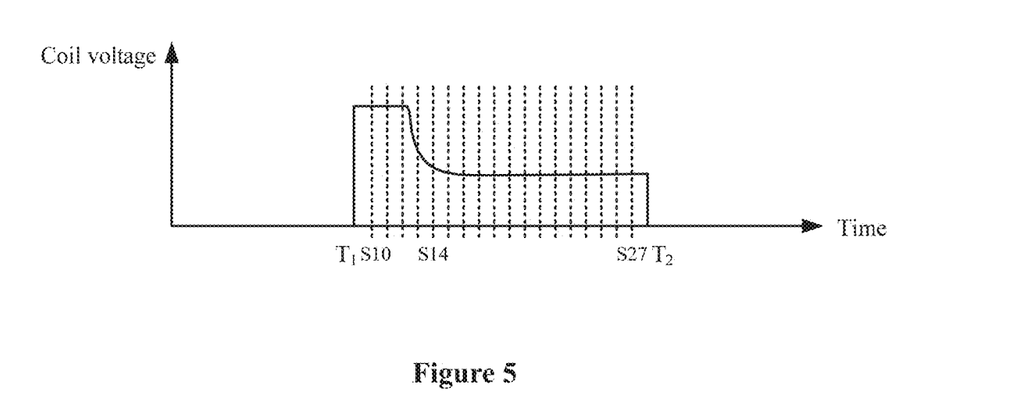
FIG. 5 is a schematic diagram showing the correspondence relationship between the voltage of a phase coil, to which no voltage is applied, and the time.
Figure 6:
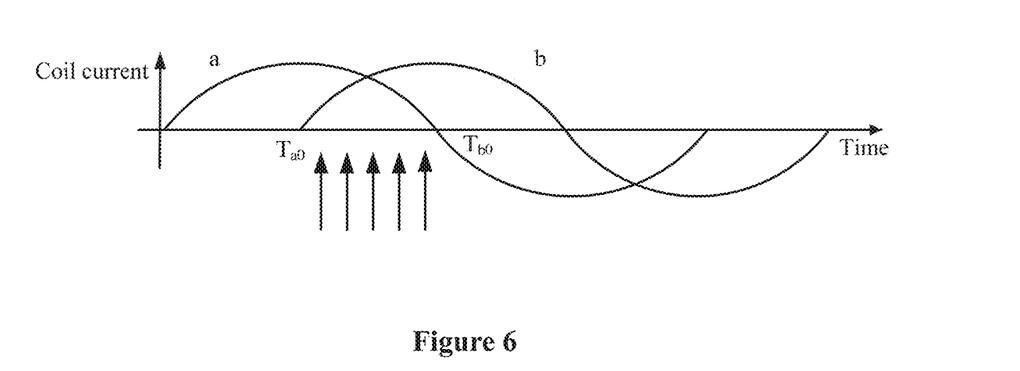
FIG. 6 is a schematic diagram showing the correspondence relationship between the currents of the a-phase coil and the b-phase coil of the motor and the time.

Referring to FIG. 6, a first period $T_{a0}$ (corresponding to a micro-step value of 0) and a second period $T_{b0}$ (corresponding to a micro-step value of 16) correspond to two periods in which no voltage is applied to the a-phase coil and the b-phase coil. Sampling the coil voltage occurs in these periods, such that the micro-step value of 0, that is, a last sampled voltage value in the first time period $T_{a0}$, is stored in the bemf register 234 until the second time period $T_{b0}$. The first time period $T_{a0}$ corresponds to a period between a first time point $T_1$ and a second time point $T_2$ shown in FIG. 4. The drive control module 23 continuously samples the coil voltage between the first time point $T_1$ and the second time point $T_2$, and updates the sample value stored in the bemf register 234. As shown in FIG. 5, in this embodiment, according to the speed of the motor, the first sampling is S10 and the last sampling is S27. The number of times the voltage is sampled is 18, and each sample value is updated and stored in the bemf register 234. After the second time point $T_2$, the bemf register stores the last sample value until a starting point of the second period $T_{b0}$. As shown in FIG. 6, during a period from an ending point of the first time period $T_{a0}$ to the starting point of the second time period $T_{b0}$, the bemf register 234 always stores the last sample value.

As shown in FIG. 5, the first sampling S10 to the 18th sampling S27 occur in the first time period $T_{a0}$, and the time period corresponds to the same micro-step value stored in the micro-step register 235. If the set value for the motor stepping mode is 16 micro-steps, the corresponding value range of the micro-step register 235 may range from 0 to 63, and this range corresponds to 4 full steps, that is, one drive cycle. The micro-step values are 0, 16, 32, and 48, respectively. When the micro-step value is 0, the micro-step value corresponds to the time period between the first time point $T_1$ and the second time point $T_2$ shown in FIG. 4.

Referring to FIG. 4, the first time point $T_1$ is a moment when the voltage is stopped from being applied to the coil, the current of the coil does not immediately become zero, and there is always a problem that the coil voltage between the first time point $T_1$ and a delay time point $T_{decay}$ is not an actual back electromotive force of the coil. Thus, a delay module 236 may be integrated in the logic processing register 233, such that the central processing module 22 reads the digital signal bemf$_i$ from the drive control module 23 after the delay time point $T_{decay}$, to allow the sampled coil voltage to more approximate to the actual back electromotive force, thereby further improving the reliability of control. Step b3 may also be used, such that the central processing module reads the digital signal after the second time point $T_2$ and the sampled voltage of the coil is more approximate to the actual back electromotive force, thereby further improving the reliability of control.

The control method of the embodiments of the present application is described below in conjunction with FIG. 7, FIG. 8, FIG. 9 and FIG. 10.

Figure 7:
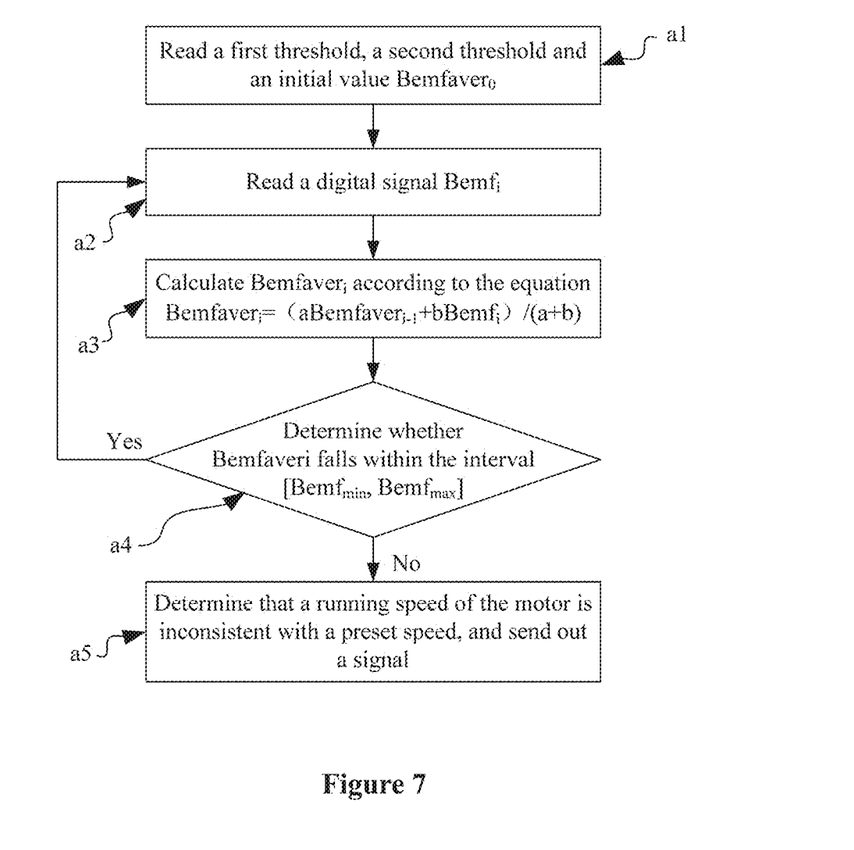
FIG. 7 is a schematic flow chart of a first embodiment of a control method according to the present application.

Referring to FIG. 7, a first embodiment of the control method is capable of determining whether the actual running speed of the motor is consistent with the set speed. An initial value $Bemfaver_0$ is set according to a preset speed. A first threshold $Bemf_{min}$ and a second threshold $Bemf_{max}$ correspond to a minimum value and a maximum value of a digital signal corresponding to the set speed of the motor, respectively. The control method includes the following steps a1 to a5:

In Step a1, a first threshold $Bemf_{min}$, a second threshold $Bemf_{max}$ and an initial value $Bemfaver_0$ are read.

In Sep a2, a digital signal $Bemf_i$ is read.

In Step a3, a present average value $Bemfaver_i$ is calculated according to the equation $Bemfaver_i=(aBemfaver_{i-1}+bBemf_i)/(a+b)$, where i represents the number of times the digital signal is read, i=1, 2 . . . , and when i=1, $Bemfaver_{i-1}$ is the initial value $Bemfaver_0$.

In Step a4, it is determined whether the present average value $Bemfaver_i$ is within an interval between the first threshold $Bemf_{min}$ and the second threshold $Bemf_{max}$, and if yes, Step a2 is performed, otherwise Step a5 is performed.

In Step a5, it is determined that a running speed of the motor is inconsistent with a preset speed, and a control signal is sent out.

Generally, one preset speed corresponds to one digital signal $Bemf_i$, the digital signal $Bemf_i$ corresponding to the speed is given an error range, for example, the error range is from −10% to +10%, the first threshold $Bemf_{min}=0.9Bemf_i$, and the second threshold $Bemf_{max}=1.1Bemfi$. If the present average value $Bemfaver_i$ corresponding to the digital signal obtained by each sampling falls within the interval [$Bemf_{min}$, $Bemf_{max}$], it indicates that the actual running speed of the motor matches the set speed within a certain error range, otherwise the motor speed is abnormal. If it is detected that the actual running speed of the motor does not match the set speed, it will be displayed on a screen or prompted by an alarm. By adopting the control method, the actual running speed of the motor can be monitored in real time during the starting process of the motor, and problems may be found and solved in time, which is advantageous for improving the control accuracy. Apparently, an error ratio may be set to other values according to the control accuracy and the system operating capacity; for example, in a case that the system operating capacity is sufficient, the error ratio may be set between 5% and 20%.

Figure 8:
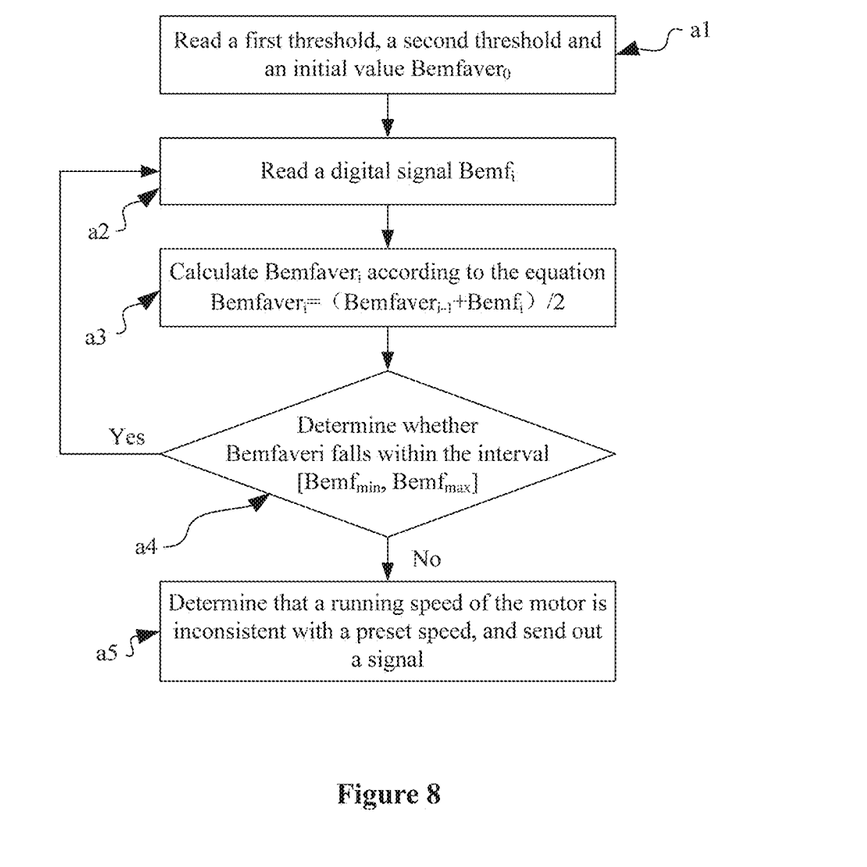
FIG. 8 is a schematic flow chart of a second embodiment of the control method according to the present application.

FIG. 8 is a second embodiment of the control method, which can determine whether the actual running speed of the motor is consistent with the set speed. An initial value $Bemfaver_0$ is set according to the preset speed. A first threshold $Bemf_{min}$ and a second threshold $Bemf_{max}$ correspond to a minimum value and a maximum value of a digital signal corresponding to the set speed of the motor, respectively. The control method includes the following steps a1 to a5.

In Step a1, a first threshold $Bemf_{min}$, a second threshold $Bemf_{max}$ and an initial value $Bemfaver_0$ are read.

In Sep a2, a digital signal $Bemf_i$ is read.

In Step a3, a present average value $Bemfaver_i$ is calculated according to the equation $Bemfaver_i=(Bemfaver_{i-1}+Bemf_i)/2$, where i represents the number of times the digital signal is read, i=1, 2 . . . , and when i=1, $Bemfaver_{i-1}$ is the initial value $Bemfaver_0$.

In Step a4, it is determined whether the present average value $Bemfaver_i$ is within an interval between the first threshold $Bemf_{min}$ and the second threshold $Bemf_{max}$, and if yes, Step a2 is performed, otherwise Step a5 is performed.

In Step a5, it is determined that a running speed of the motor is inconsistent with a preset speed and a control signal is sent out.

This embodiment is different from the first embodiment in that a coefficient of the previous average value and a coefficient of the present digital signal are both set to 1 in this embodiment to obtain the present average value, and in this way, the mathematical operation of the system is simple, which is beneficial to reducing the occupation of the system and improving the running speed of the system.

Figure 9:
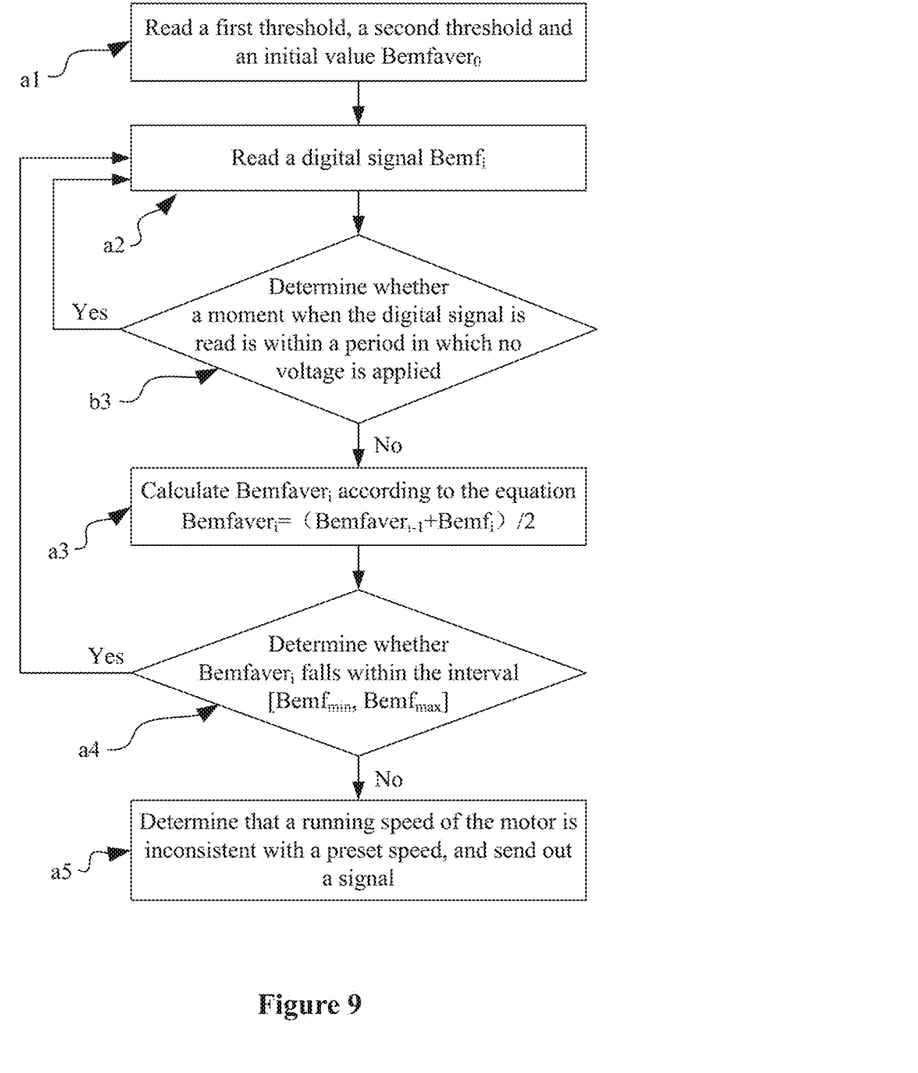
FIG. 9 is a schematic flow chart of a third embodiment of the control method according to the present application.

FIG. 9 is a third embodiment of the control method, which can determine whether the actual running speed of the motor is consistent with the set speed. An initial value $Bemfaver_0$ is set according to the preset speed. A first threshold $Bemf_{min}$ and a second threshold $Bemf_{max}$ correspond to a minimum value and a maximum value of a digital signal corresponding to the set speed of the motor, respectively. The control method includes the following steps a1, a2, b3, a3, a4 and a5.

In Step a1, a first threshold $Bemf_{min}$, a second threshold $Bemf_{max}$ and an initial value $Bemfaver_0$ are read.

In Sep a2, a digital signal $Bemf_i$ is read.

In Step b3, it is determined whether a moment when the digital signal $Bemf_i$ is read is within a period in which no voltage is applied to any phase coil of the motor, and if yes, Step a2 is performed, otherwise Step a3 is performed.

In Step a3, a present average value $Bemfaver_i$ is calculated according to the equation $Bemfaver_i=(Bemfaver_{i-1}+Bemf_i)/2$, where i represents the number of times the digital signal is read, i=1, 2 . . . , and when i=1, $Bemfaver_{i-1}$ is the initial value $Bemfaver_0$.

In Step a4, it is determined whether the present average value $Bemfaver_i$ is within an interval between the first threshold $Bemf_{min}$ and the second threshold $Bemf_{max}$, and if yes, Step a2 is performed, otherwise Step a5 is performed.

Step a5, it is determined that a running speed of the motor is inconsistent with a preset speed and a control signal is sent out.

The main difference from the second embodiment is that, in this embodiment Step b3 is included, and in Step b3 it is determined whether a moment when the digital signal $Bemf_i$ is read is within a period in which no voltage is applied to any phase coil of the motor, and if yes, Step a2 is performed, otherwise Step a3 is performed. A situation in which the voltage of the coil read by the central processing module 22 from the bemf register does not coincide with the back electromotive force of the coil is excluded by setting Step b3, thereby further improving the reliability of control.

Apparently, this embodiment is described on the basis of the second embodiment, and Step b3 may also be applied to the first embodiment, which can address the same technical issue as that of this embodiment and achieve the same technical effect.

Figure 10:
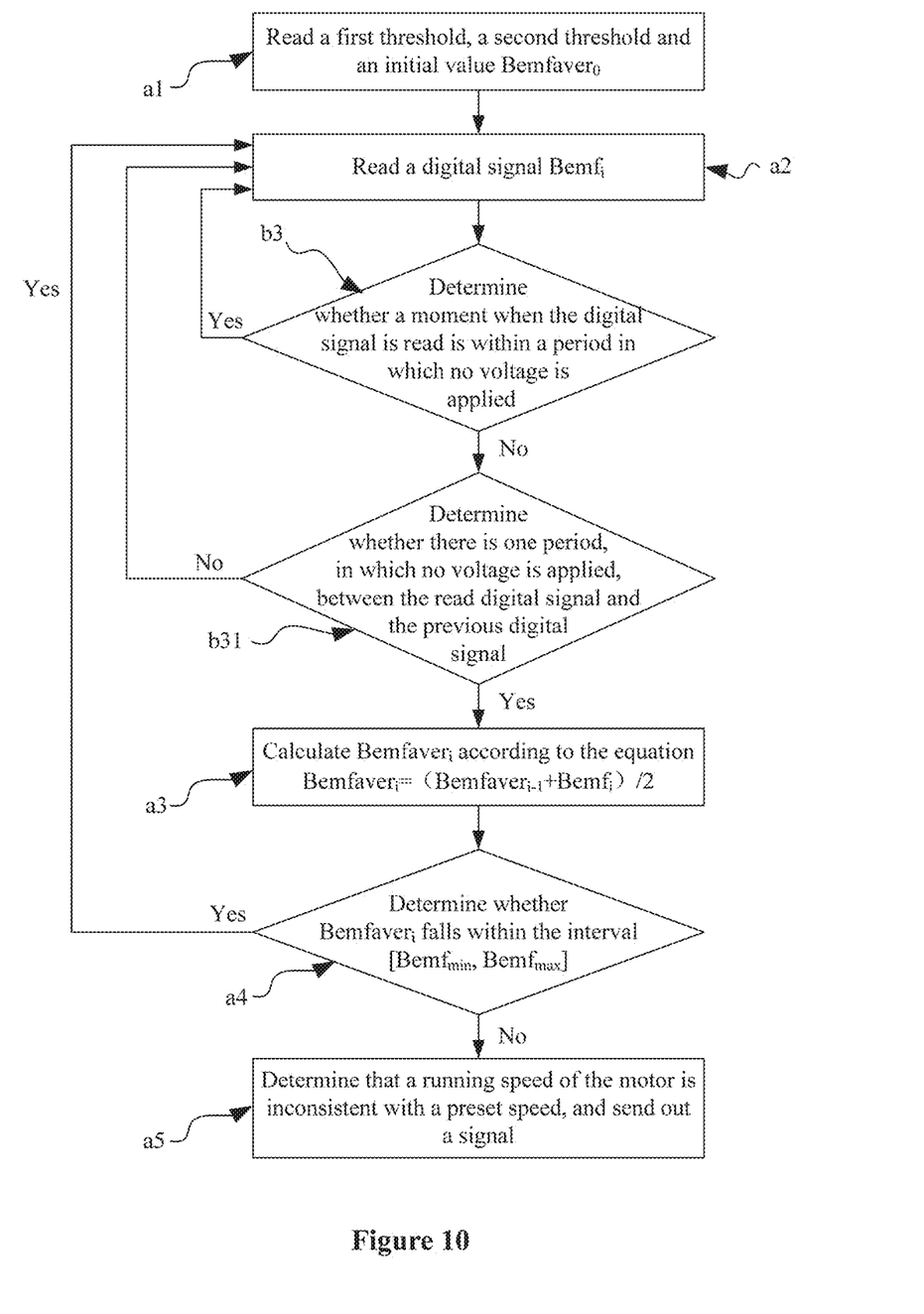
FIG. 10 is a schematic flow chart of a fourth embodiment of the control method according to the present application.

FIG. 10 is a fourth embodiment of the control method, which can determine whether the actual running speed of the motor is consistent with the set speed. An initial value $Bemfaver_0$ is set based on the preset speed. A first threshold $Bemf_{min}$ and a second threshold $Bemf_{max}$ correspond to a minimum value and a maximum value of a digital signal corresponding to the set speed of the motor, respectively. The control method includes the following steps a1, a2, b3, b31, a3, a4 and a5.

In Step a1, a first threshold $Bemf_{min}$, a second threshold $Bemf_{max}$ and an initial value $Bemfaver_0$ are read.

In Sep a2, a digital signal $Bemf_i$ is read.

In Step b3, it is determined whether a moment when the digital signal $Bemf_i$ is read is within a period in which no voltage is applied to any phase coil of the motor, and if yes, Step a2 is performed, otherwise Step a3 is performed.

In Step b31, it is determined whether there is one period, in which no voltage is applied to any phase coil of the motor, included between the read digital signal and the previous digital signal, and if yes, step a3 is performed, otherwise step a2 is performed.

In Step a3, a present average value $Bemfaver_i$ is calculated according to the equation $Bemfaver_i=(Bemfaver_i-1+Bemf_i)/2$, where i represents the number of times the digital signal is read, i=1, 2 . . . , and when i=1, $Bemfaver_{i-1}$ is the initial value $Bemfaver_0$.

In Step a4, it is determined whether the present average value $Bemfaver_i$ is within an interval between the first threshold $Bemf_{min}$ and the second threshold $Bemf_{max}$, and if yes, Step a2 is performed, otherwise Step a5 is performed.

In Step a5, it is determined that a running speed of the motor is inconsistent with a preset speed and a control signal is sent out.

Compared with the third embodiment, Step b31 is added in this embodiment, and in Step b31 it is determined whether there is one period, in which no voltage is applied to any phase coil of the motor, included between the read digital signal and the previous digital signal, and if yes, Step a3 is performed, otherwise Step a2 is performed. Since one digital signal $Bemf_i$ may be read by the central processing module 22 multiple times, and may be reused, the control speed may be slowed down. It is ensured that the digital signal $Bemf_i$ read multiple times is used only once by recording the digital signal $Bemf_i$ read by the central processing module multiple times as one effective value during the period in which no voltage is applied to any phase coil, and it is further determined whether the running speed of the motor is consistent with the preset speed. Such method can avoid the problem that the digital signal is reused, and is beneficial to improving the reliability and efficiency of the motor control.

Apparently, this embodiment is described on the basis of the third embodiment, and Step b3 may also be applied to the first embodiment, which can address the same technical issue as that of this embodiment and achieve the same technical effect Based on the properties of the motor and the running speed of the motor, the motor usually has a certain motor resonance interval. In order to ensure the normal operation of the motor, the control method generally further includes Step b2 after or before Step a1. In Step b2, the motor speed is controlled to avoid the resonance interval of the motor, where the speed corresponding to the motor resonance interval is related to the properties of the motor itself.

The control method for the motor speed can be applied to many occasions. The control methods for the motor speed, disclosed in the present application and used for determining whether the actual motor speed falls in a certain error range of the set speed, fall within the scope of protection of the present application. Devices, in which the central processing module and the drive control module disclosed in the present application are adopted to drive the motor and the control method for the motor speed disclosed in the present application is adopted to control and detect the operating state of the motor speed, fall within the scope of protection of the present application.

It should be noted that the above embodiments are only for explaining the present application and are not intended to limit the technical solutions described in the present application. Although the present application has been described in detail with reference to the embodiments described above, it should be understood by those skilled in the art that modifications or equivalent substitutions can still be made to the present application by those skilled in the art, and all the technical solutions and modifications thereof without departing from the spirit and scope of the present application fall within the scope of the claims.

The invention claimed is:

1. A control system, wherein the control system is configured to control a motor, and comprises a central processing module and a drive control module;
    when the motor is running, the drive control module is configured to sample a voltage of a phase coil of the motor, to which no voltage is applied, during a period in which no voltage is applied to any phase coil of the motor, and convert the voltage of the phase coil of the motor, to which no voltage is applied, into a digital signal;
    the control system is configured to store the digital signal and update the digital signal in real time during the period in which no voltage is applied to any phase coil of the motor;
    the central processing module is configured to read the digital signal, and obtain a present average value by performing a mathematical operation on the present digital signal and either a previous average value or an initial value; and
    the central processing module is configured to determine whether the present average value falls between a first threshold and a second threshold, wherein the first threshold and the second threshold are set corresponding to a preset speed, and the central processing module is configured to determine whether a running speed of the motor is consistent with the preset speed according to a determination result and send out a control signal.

2. The control system according to claim 1, wherein the drive control module comprises a coil sample-and-hold circuit and an ADC circuit, the coil sample-and-hold circuit is configured to sample the voltage of the coil, and the ADC circuit is configured to convert the sampled voltage signal of the coil into the digital signal.

3. The control system according to claim 1, wherein the drive control module further comprises a logic processing register, the logic processing register comprises a bemf register, and the bemf register is configured to store the digital signal converted by the ADC circuit.

4. The control system according to claim 3, wherein the logic processing register further comprises a micro-step register, and the micro-step register is configured to store a micro-step value of the motor.

5. The control system according to claim 3, wherein the logic processing register is configured to provide a clock signal to the coil sample-and-hold circuit, to allow voltage sampling of the coil performed by the coil sample-and-hold circuit occurs during the period in which no voltage is applied to any phase coil of the motor.

6. A control method, wherein the control method is used for controlling a motor and is implemented by a control system, and the control system comprises a central processing module and a drive control module;

when the motor is running, the drive control module is configured to sample a voltage of a phase coil of the motor, to which no voltage is applied, during a period in which no voltage is applied to any phase coil of the motor, and convert the voltage of the phase coil of the motor, to which no voltage is applied, into a digital signal;

the control system is configured to store the digital signal and update the digital signal in real time during the period in which no voltage is applied to any phase coil of the motor;

the central processing module is configured to read the digital signal, obtain a present average value of the digital signal, and perform the control method, and the control method comprises the following steps:

a1, reading a first threshold $Bemf_{min}$, a second threshold $Bemf_{max}$ and either an initial value $Bemfaver_0$ or a previous average value;

a2, reading a digital signal $Bemf_i$;

a3, calculating a present average value $Bemfaver_i$ according to an equation $Bemfaver_i=(aBemfaver_{i-1}+bBemf_i)/(a+b)$, wherein i represents the number of times the digital signal is read, i=1, 2 . . . , and when i=1, $Bemfaver_{i-1}$ is the initial value $Bemfaver_0$;

a4, determining whether the present average value $Bemfaver_i$ falls between the first threshold $Bemf_{min}$ and the second threshold $Bemf_{max}$, and if yes, proceeding to Step a2, otherwise proceeding to Step a5; and a5, determining that a running speed of the motor is inconsistent with a preset speed and sending out a control signal.

7. A control method, wherein the control method is used for controlling a motor and is implemented by a control system, and the control system comprises a central processing module and a drive control module;

when the motor is running, the drive control module is configured to sample a voltage of a phase coil of the motor, to which no voltage is applied, during a period in which no voltage is applied to any phase coil of the motor, and convert the voltage of the phase coil of the motor, to which no voltage is applied, into a digital signal;

the control system is configured to store the digital signal and update the digital signal in real time during the period in which no voltage is applied to any phase coil of the motor;

the central processing module is configured to read the digital signal, obtain a present average value of the digital signal, and perform the control method, the control method comprises the following steps:

a1, reading a first threshold $Bemf_{min}$, a second threshold $Bemf_{max}$ and either an initial value $Bemfaver_0$ or a previous average value;

a2, reading a digital signal $Bemf_i$;

a3, calculating a present average value $Bemfaver_i$ according to an equation $Bemfaver_i=(Bemfaver_{i-1}+Bemf_i)/2$, wherein i represents the number of times the digital signal is read, i=1, 2 . . . , and when i=1, $Bemfaver_{i-1}$ is the initial value $Bemfaver_0$;

a4, determining whether the present average value $Bemfaver_i$ falls between the first threshold $Bemf_{min}$ and the second threshold $Bemf_{max}$, and if yes, proceeding to Step a2, otherwise proceeding to Step a5; and a5, determining that a running speed of the motor is inconsistent with a preset speed and sending out a control signal.

8. The control method according to claim 6, further comprising Step b3 after Step a2:

Step b3, determining whether a moment when the digital signal is read is within the period in which no voltage is not applied to any phase coil of the motor, and if yes, proceeding to Step a2, otherwise proceeding to Step a3.

9. The control method according to claim 8, further comprising Step b31 after Step b3:

Step b31, determining whether there is one period, in which no voltage is applied to any phase coil of the motor, included between the read digital signal and the previous digital signal, and if yes, proceeding to Step a3, otherwise proceeding to Step a2.

10. The control method according to claim 9, further comprising Step b2 after or before Step a1:

Step b2, controlling a motor speed to avoid a resonance interval of the motor, wherein a speed corresponding to the motor resonance interval is related to properties of the motor itself.

11. The control method according to claim 7, further comprising Step b3 after Step a2:

Step b3, determining whether a moment when the digital signal is read is within the period in which no voltage is not applied to any phase coil of the motor, and if yes, proceeding to Step a2, otherwise proceeding to Step a3.

12. The control method according to claim 11, further comprising Step b31 after Step b3:

Step b31, determining whether there is one period, in which no voltage is applied to any phase coil of the motor, included between the read digital signal and the previous digital signal, and if yes, proceeding to Step a3, otherwise proceeding to Step a2.

13. The control method according to claim 12, further comprising Step b2 after or before Step a1:

Step b2, controlling a motor speed to avoid a resonance interval of the motor, wherein a speed corresponding to the motor resonance interval is related to properties of the motor itself.

14. The control system according to claim 2, wherein the drive control module further comprises a logic processing register, the logic processing register comprises a bemf register, and the bemf register is configured to store the digital signal converted by the ADC circuit.

15. The control system according to claim 14, wherein the logic processing register further comprises a micro-step register, and the micro-step register is configured to store a micro-step value of the motor.

16. The control system according to claim 4, wherein the logic processing register is configured to provide a clock signal to the coil sample-and-hold circuit, to allow voltage sampling of the coil performed by the coil sample-and-hold circuit occurs during the period in which no voltage is applied to any phase coil of the motor.

* * * * *